(12) United States Patent
Montague

(10) Patent No.: US 12,151,768 B2
(45) Date of Patent: Nov. 26, 2024

(54) FOLDABLE STEP-THROUGH MID-DRIVE E-BIKE AND FOLDING BIKE FASTENED BY STEERING ASSEMBLY

(71) Applicant: Montague Corporation, Cambridge, MA (US)

(72) Inventor: David Montague, Cambridge, MA (US)

(73) Assignee: Montague Corporation, Cambridge, MA (US)

( * ) Notice: Subject to any disclaimer, the term of this patent is extended or adjusted under 35 U.S.C. 154(b) by 651 days.

(21) Appl. No.: 17/262,314

(22) PCT Filed: Jul. 23, 2018

(86) PCT No.: PCT/US2018/043274
§ 371 (c)(1),
(2) Date: Jan. 22, 2021

(87) PCT Pub. No.: WO2020/023004
PCT Pub. Date: Jan. 30, 2020

(65) Prior Publication Data
US 2021/0261217 A1  Aug. 26, 2021

(51) Int. Cl.
*B62K 15/00* (2006.01)
*B62M 6/55* (2010.01)
*B62M 6/90* (2010.01)

(52) U.S. Cl.
CPC ............. *B62K 15/006* (2013.01); *B62M 6/55* (2013.01); *B62M 6/90* (2013.01)

(58) Field of Classification Search
CPC .... B62K 15/00; B62K 15/006; B62K 15/008; B62M 6/55; B62M 6/40; B62M 6/90
(Continued)

(56) References Cited

U.S. PATENT DOCUMENTS 1,584,314 A * 5/1926 Mamiya ............... B62K 15/006
 280/278
3,342,281 A * 9/1967 Elia .......................... B62K 3/10
 280/287

(Continued)

FOREIGN PATENT DOCUMENTS

| EP | 0 905 013 A3 | 3/1999 |
| EP | 1 193 170 B1 | 6/2005 |
| JP | 2011-207249 A | 10/2011 |

OTHER PUBLICATIONS

International Search Report for PCT/US2018/043274 dated Oct. 1, 2018 [PCT/ISA/210].

(Continued)

*Primary Examiner* — Anne Marie M Boehler
(74) *Attorney, Agent, or Firm* — Sughrue Mion, PLLC

(57) ABSTRACT

Presented herein is a foldable bicycle (folding bike) with improvement including a step-through or low step-over electric bicycle (eBike, pedelec) with a main frame member or members extending rearward from the head tube to a hinge and a bottom bracket where a mid-drive motor may be positioned, and wherein at least one battery is mounted to the frame, and wherein the hinge is located near the midpoint of the bicycle and allows the front frame assembly and the rear frame assembly to pivot laterally around the hinge in a manner moving generally parallel to the ground to a folded position. Other improvements presented herein include a foldable bicycle, electric, or non-electric, with a handlebar and stem which are moveable to a steering assembly storage position, and in the storage position the handlebar and/or stem serve to fasten the foldable bicycle in the folded position. The folded bicycle may be rolled along the ground in the folded position.

14 Claims, 11 Drawing Sheets

(58) Field of Classification Search
USPC ........ 180/206.1, 207.3, 206.4, 208; 280/278, 280/287
See application file for complete search history.

(56) References Cited

U.S. PATENT DOCUMENTS

| | | | |
|---|---|---|---|
| 3,993,322 A | 11/1976 | Van Tijen | |
| 4,438,942 A * | 3/1984 | Hon | B62K 15/006 |
| | | | 280/274 |
| 5,492,350 A * | 2/1996 | Pan | B62K 15/006 |
| | | | 280/278 |
| 6,739,421 B1 | 5/2004 | Miya | |
| 7,055,842 B1 | 6/2006 | Lin | |
| 8,640,805 B2 * | 2/2014 | Kuroki | B60L 50/20 |
| | | | 180/205.1 |
| 8,881,857 B2 * | 11/2014 | Binggeli | B62K 19/30 |
| | | | 180/68.5 |
| 11,313,411 B2 * | 4/2022 | Li | F16C 11/103 |
| 2006/0087095 A1 | 4/2006 | Huang | |
| 2007/0290479 A1 * | 12/2007 | Tong | B62K 15/008 |
| | | | 280/278 |
| 2011/0168472 A1 * | 7/2011 | Li | B60L 15/2045 |
| | | | 310/254.1 |
| 2012/0043148 A1 | 2/2012 | Brady et al. | |
| 2017/0158284 A1 * | 6/2017 | Hayslett | B62M 6/90 |
| 2019/0202520 A1 * | 7/2019 | Yap | B62K 15/006 |

OTHER PUBLICATIONS

Written Opinion for PCT/US2018/043274 dated Oct. 1, 2018 [PCT/ISA/237].
Extended European Search Report dated Feb. 9, 2022 in European Application No. 18927620.7.

* cited by examiner

FOLDABLE STEP-THROUGH MID-DRIVE E-BIKE AND FOLDING BIKE FASTENED BY STEERING ASSEMBLY

CROSS REFERENCE TO RELATED APPLICATIONS

This application is a National Stage of International Application No. PCT/US2018/043274 filed Jul. 23, 2018.

BACKGROUND OF THE INVENTION

1. Field of the Invention

Embodiments of the present invention relate to a low step-through foldable mid-drive electric bicycle and embodiments of the present invention relate to a foldable bicycle that may be fastened in the folded position using a novel steering assembly, and rolled along in the folded position.

2. Description of Related Art

Folding bicycles have been in existence for over 100 years and are useful as they allow an otherwise large bicycle to be folded for more convenient storage, or transport. However folding bikes are often difficult to fold, causing the user to struggle through the process and few fold down to a small manageable package or lock easily and securely in the folded position allowing for easy handling, such as when boarding a train, or when placing the folded bike in the trunk of a car, and few can be rolled along in the folded position. Electric powered bicycles, or eBikes, are a newer entry, and generally consist of a bicycle equipped with an electric motor, and a battery to drive the electric motor. They have become popular as they allow riders to cover larger distances than possible simply using human power. Due to the increased complexity of having a motor and battery, they are often more expensive than a non-electric bicycle, making them more prone to theft when locked in a public setting. Therefore providing an electric bicycle that can be folded and stored safely indoors is advantageous. There are numerous examples of folding electric bicycles, most with smaller wheels and unconventional frame geometries with long flexible telescoping seat posts and handlebar stems, which make them more challenging to ride, and more susceptible to poor road surfaces. In addition, due to the location of a folding hinge, they typically use hub motors that do not interfere with the frame hinge, but are susceptible to damage, and do not take advantage of the bicycle's gear system. Often heavy elements such as batteries are located higher above the ground leading to less stability.

Therefore, there is a need to provide a new system to conveniently fasten a folded bicycle in the folded position, and to additionally apply such a locking system to an electric bicycle, preferably a low step-through foldable electric bicycle that uses more conventional, comfortable geometry, and which easily folds to a small size, and is easy to roll along in the folded position.

SUMMARY OF THE INVENTION

It is an objective of the present invention to set forth a foldable bicycle or eBike equipped with a front wheel steering assembly that combines 1) the moving of the handlebars mounted in a transverse position for riding to a position aligned with the front wheel with 2) the locking of the foldable bicycle in the folded position. The bicycle is configured to allow for easy rolling in the folded position.

It is a further objective of the present invention to define a foldable low step-through electric bicycle wherein a main tube or tubes extends rearward from the head tube in the direction of the bottom bracket where a mid-drive motor is positioned, and wherein a battery is mounted either above the motor in the seat tube area, or in the main tube or tubes area, and wherein the bicycle frame contains a hinge located near the midpoint which allows the front of the bicycle to fold about the hinge in a lateral or side to side direction such that the front wheel ends up adjacent to, and generally parallel to the rear wheel. The bicycle is configured to allow for easy rolling in the folded position.

In accordance with a first aspect of the present invention, a foldable electric bicycle is presented comprising: a front frame assembly comprising: a front wheel steering assembly comprising: a front fork, a handlebar and stem mounted to said front fork, a front wheel with rotation axle mounted to said front fork; a front frame comprising: a head tube for pivotally mounting said steering assembly, at least one front main member; a rear frame assembly comprising: a rear frame comprising: a rear wheel mounting assembly, a seat tube member, a bottom bracket area mount for mounting an electric motor and pedal crank assembly; a rear wheel with rotation axle mounted to the rear wheel mounting assembly, a seat post and seat mounted to the seat tube member, a pedal crank assembly and a drive power transfer component, an electric motor mounted at the bottom bracket area mount to drive the drive power transfer component; a hinge with a pivot axis oriented generally vertical to the ground, located proximate to a vertical mid-way plane equidistant from the rotation axis of the front wheel rotation axle and the rotation axis of the rear wheel rotation axle; a locking mechanism comprising components on the front frame assembly and components on the rear frame assembly; at least one battery mounted to the rear frame assembly and/or the front frame assembly to supply electrical power to the electric motor; wherein the 'at least one front main member' is connected to the head tube and extends generally rearward from the head tube to the hinge; and wherein, at the vertical mid-way plane, no portion of any structural frame member is located above a straight line drawn between the top tangent point of the front wheel and the top tangent point of the rear wheel; and wherein the hinge joins the front frame assembly and the rear frame assembly together in an operative riding position and allows the front frame assembly and the rear frame assembly to pivot laterally around the hinge in a manner moving generally parallel to the ground, from the operative riding position to a folded position such that the front wheel is adjacent to, and generally parallel with, the rear wheel.

In accordance with a second aspect of the present invention, at least one battery is mounted on or in the seat tube member.

In accordance with a third aspect of the present invention, at least one battery is mounted on or in the at least one front main member.

In accordance with a fourth aspect of the present invention, the foldable electric bicycle is configured to be rolled along the ground on the front wheel and the rear wheel in the folded position and preferably the handlebar may be used as a handle to roll the foldable electric bicycle.

In accordance with a fifth aspect of the present invention, the locking mechanism comprises an actuator positioned above the at least one front main member which moves a locking mechanism element between a locked state and a unlocked state and preferably the actuator operates the locking mechanism element positioned below the at least one front main member.

In accordance with a sixth aspect of the present invention, the locking mechanism comprises a primary locking system, and a secondary fastening system and is preferably configured to require the active and ongoing actuation of a release mechanism during at least a first portion of said pivot laterally around the hinge to the folded position and more preferably at least a portion of the locking mechanism is configured to automatically engage when the foldable electric bicycle is pivoted laterally around the hinge to the operative riding position.

In accordance with a seventh aspect of the present invention, the electric motor provides power to assist in driving the drive power transfer component, such as a chain or belt, preferably when an operator is operating the pedal crank assembly of the foldable electric bicycle.

In accordance with a eighth aspect of the present invention, the electric motor provides power to drive the drive power transfer component independent from whether an operator is operating the pedal crank assembly of the foldable electric bicycle.

In accordance with a ninth aspect of the present invention, in the folded position, the at least one front main member is positioned adjacent to, and generally parallel with, the seat tube member.

In accordance with a tenth aspect of the present invention, the rear wheel mounting assembly fastens to the rear wheel on at least one side of the rear wheel and the front fork fastens to the front wheel on at least one side of the front wheel.

In accordance with an eleventh aspect of the present invention, a foldable bicycle is presented comprising: a front frame assembly comprising: a front wheel steering assembly comprising: a front fork, a handlebar and stem mounted to the front fork, a front wheel with rotation axle mounted to the front fork; a front frame comprising: a head tube for pivotally mounting the steering assembly, a front frame member or members; a rear frame assembly comprising: a rear frame comprising: a rear wheel mounting assembly, a seat tube member, a rear wheel with rotation axle mounted to the rear wheel mounting assembly, a seat post and seat mounted to the seat tube member; a hinge with a pivot axis oriented generally vertical to the ground, located proximate to a vertical mid-way plane equidistant from the rotation axis of the front wheel rotation axle and the rotation axis of the rear wheel rotation axle; a locking mechanism comprising components on the front frame assembly and components on the rear frame assembly; wherein the hinge joins the front frame assembly and the rear frame assembly together in an operative riding position and allows the front frame assembly and the rear frame assembly to pivot laterally around the pivot axis in a manner moving generally parallel to the ground, from the operative riding position to a folded position such that the front wheel is adjacent to, and generally parallel with, the rear wheel; wherein the handlebar and stem are moveable to a steering assembly storage position, and in the steering assembly storage position the handlebar and/or the stem fasten the foldable bicycle in the folded position.

In accordance with a twelfth aspect of the present invention, the handlebar, in the steering assembly storage position, is generally parallel to the front wheel.

In accordance with a thirteenth aspect of the present invention, the foldable bicycle further comprising a steering assembly locking mechanism which fastens the front wheel steering assembly in the operative riding position.

In accordance with a fourteenth aspect of the present invention, the handlebar and stem may be locked in the steering assembly storage position and preferably by the steering assembly locking mechanism.

In accordance with a fifteenth aspect of the present invention, the handlebar and/or stem serve to fasten the foldable bicycle in the folded position by contacting and retaining the seat.

In accordance with a sixteenth aspect of the present invention, the foldable bicycle is configured to be rolled along the ground on the front wheel and the rear wheel in the folded position and preferably the handlebar is configured to be used as a handle to roll the foldable bicycle in the folded position.

In accordance with a seventeenth aspect of the present invention, the foldable bicycle further comprising at least one electric motor and at least one battery.

In accordance with a eighteenth aspect of the present invention, the foldable bicycle stem further comprises a first portion and a second portion, the first portion pivotally connected to the second portion, and the first portion comprising a first lock mounting hole, and the second portion comprising a second lock mounting hole; wherein the steering assembly locking mechanism comprises a first pivoting member comprising a pivot A and a pivot B, and a second pivoting member comprising a pivot A and a pivot C, wherein the first pivoting member is pivotally connected at pivot A to said first lock mounting hole, and the second pivoting member is pivotally connected at pivot C to the second lock mounting hole, and wherein the first pivoting member is connected at pivot B to the second pivoting member at pivot B, and wherein the distance between pivot A and pivot B on the first pivoting member is different from the distance between pivot A and pivot C on the second pivoting member.

In accordance with a nineteenth aspect of the present invention, the steering assembly locking mechanism may be moved to a locked position for the operative riding position, and in the locked position the first pivoting member is in compression, and the second pivoting member is in tension.

In accordance with a twentieth aspect of the present invention, the movement of the steering assembly to a steering assembly storage position reduces the overall width of the foldable bicycle in the folded position and preferably lowers the overall height of the foldable bicycle in the folded position and more preferably prevents unwanted lateral pivoting of the front wheel and the steering assembly in the folded position.

In accordance with a twenty-first aspect of the present invention a foldable bicycle is presented that has a mid-drive motor, which can take advantage of the gearing that the bicycle may have built in for the benefit of the riders pedaling. Furthermore, it is an aspect of the present invention to provide a bicycle that has a low center of gravity so as to provide a stable ride. Mounting the motor at the bottom bracket area mount provides a low center of gravity. Mounting the battery, or batteries, as low as possible is also advantageous. In addition, it is an aspect of the present invention to provide a bicycle that has the two heavier elements of the battery and the motor mounted near to the center of the bicycle as measured from front to back in the direction of motion. This offers a more stable configuration for riding and steering. Furthermore, it is an aspect of the present invention to provide a bicycle that can fold for easy storage in a small area such as a closet or a car trunk, thereby avoiding theft issues that stem from locking a bicycle on a public street. Furthermore, it is an aspect of the present invention to provide a bicycle that offers a good quality ride such that it does not trade off performance for the convenience of folding. Furthermore, it is an aspect of the present invention to provide a bicycle that is easy to fold. Ease of folding is accomplished by not requiring too many steps to fold, not requiring awkward motions during the process, and not requiring the lifting of heavy components during the process. And finally, it is an aspect of the present invention to provide a bicycle that fastens together in the folded position, such that when it is moved, it does not start to unfold.

While standard full-size wheels are often shown in the figures, an aspect of the present invention includes the use of smaller wheels that allow for a smaller folded size. In addition, other features, aspects and advantages of the disclosed foldable low step-through electric bicycle and the foldable bicycle that may be fastened in the folded position using a novel steering assembly, and rolled along in the folded position will become apparent to those skilled in the art from the following detailed description, which, taken in conjunction with the figures, discloses one illustrative embodiment of the invention.

DETAILED DESCRIPTION OF THE PREFERRED EMBODIMENTS

Figure 1:
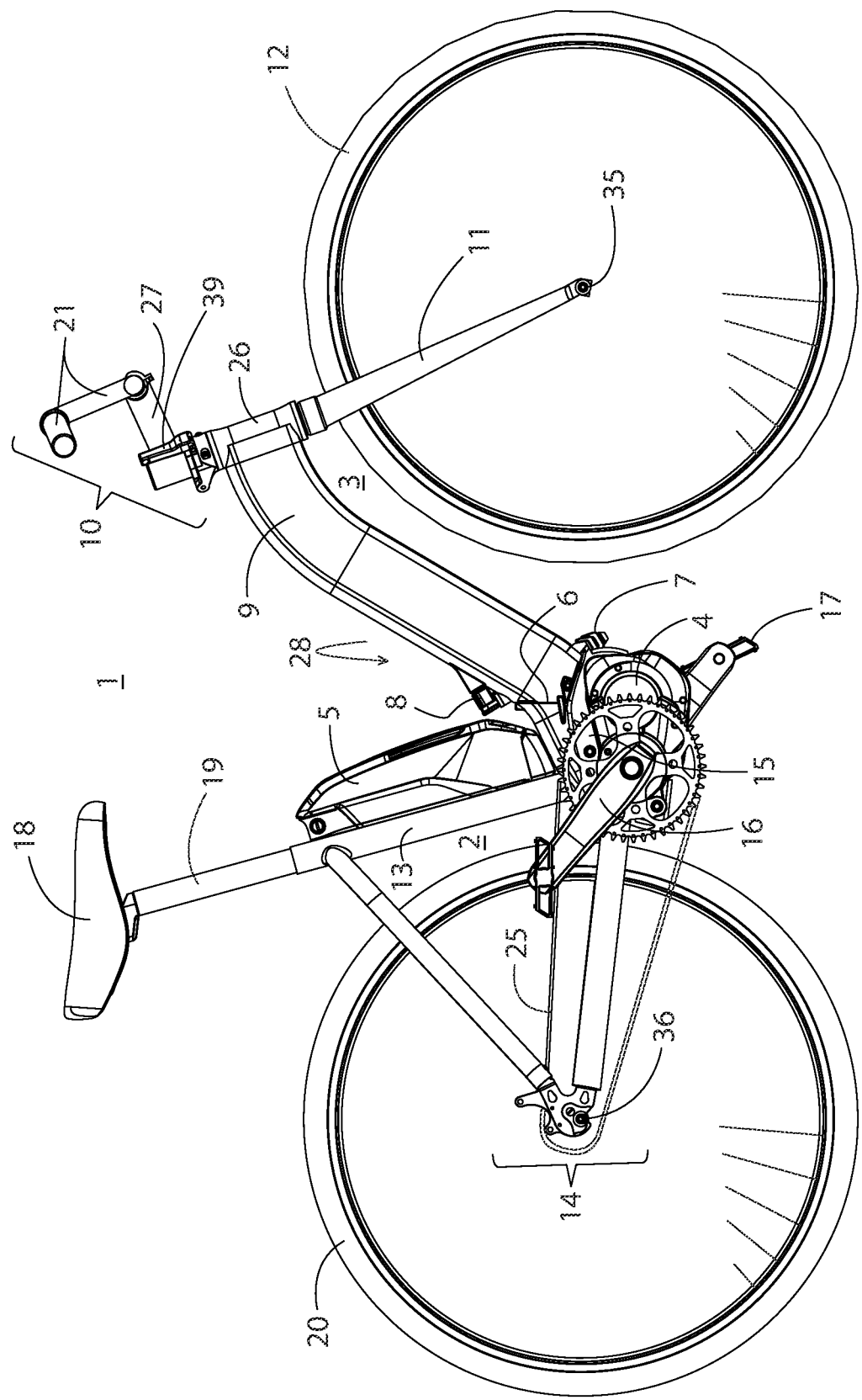
FIG. 1 illustrates a schematic right side view of the low step-through foldable electric bicycle in the riding position.

Selected embodiments of the present invention will be described in the following, and shown in the figures. It will be apparent to those skilled in the art that these descriptions and figures are provided for illustration purposes only and not for the purpose of limiting the scope of the invention which is as defined by the included claims and their equivalents. Like reference numerals designate corresponding or identical elements throughout the drawings.

Many elements of the bicycle of the present invention can be found on standard conventional bicycles, and are therefore, in some cases, not labeled and/or not shown (e.g. brakes, wheel spokes, reflectors, cables, derailleurs, etc.) as their use is well known and not novel to the present invention.

As used herein, directional terms such as "left", "right", "front", "rear", "back", "forward", "rearward", "up", "upward", "down", and "downward" as well as any other similar directional terms refer to those directions which are determined on the basis of a rider who sits on seat 18 of bicycle 1 facing the front wheel steering assembly 10 in a usual operator position. The term "outward" is used in relation to moving to the right or left from the centerline of the bicycle. Likewise, "inward" is toward the centerline.

According to one embodiment of the present invention, referring now to FIG. 1, low step-through foldable electric bicycle 1 is shown in the riding position having hinge 6 and locking mechanism 7 with actuator 8 connecting rear frame assembly 2 and a front frame assembly 3 with one front main member 9 connected to bottom bracket area mount 15 which holds electric motor 4 and pedal crank assembly 16 and pedal 17. Battery 5, mounted on seat tube member 13, supplies electrical power to electric motor 4 which drives drive power transfer component 25. Battery 5 may also be mounted to at least one front main member 9, a rear rack (not shown), or be positioned integral to electric motor 4 under the bottom bracket area mount 15. Drive power transfer component 25 may be a traditional bicycle chain, a belt, or another mechanism for power transfer. Front wheel steering assembly 10, with stem 27, handlebar 21, and steering assembly locking mechanism 39, is mounted to front fork 11 which in turn holds front wheel rotation axle 35 and front wheel 12. Rear wheel mounting assembly 14 mounts rear wheel rotation axle 36 and rear wheel 20. Seat post 19 with seat 18 is mounted to seat tube member 13. The low step-through feature is represented by arrow 28. As shown, one front main member 9 may be the only member of the front frame connected to the head tube 26 and it extends rearward from head tube 26 to the bottom bracket area mount 15 and/or the lower portion of the seat tube member 13. Front main member 9 may be replaced by two or more front members which function equivalently and which extend rearward from head tube 26 to bottom bracket area mount 15 and/or the lower portion of seat tube member 13.

Figure 2:
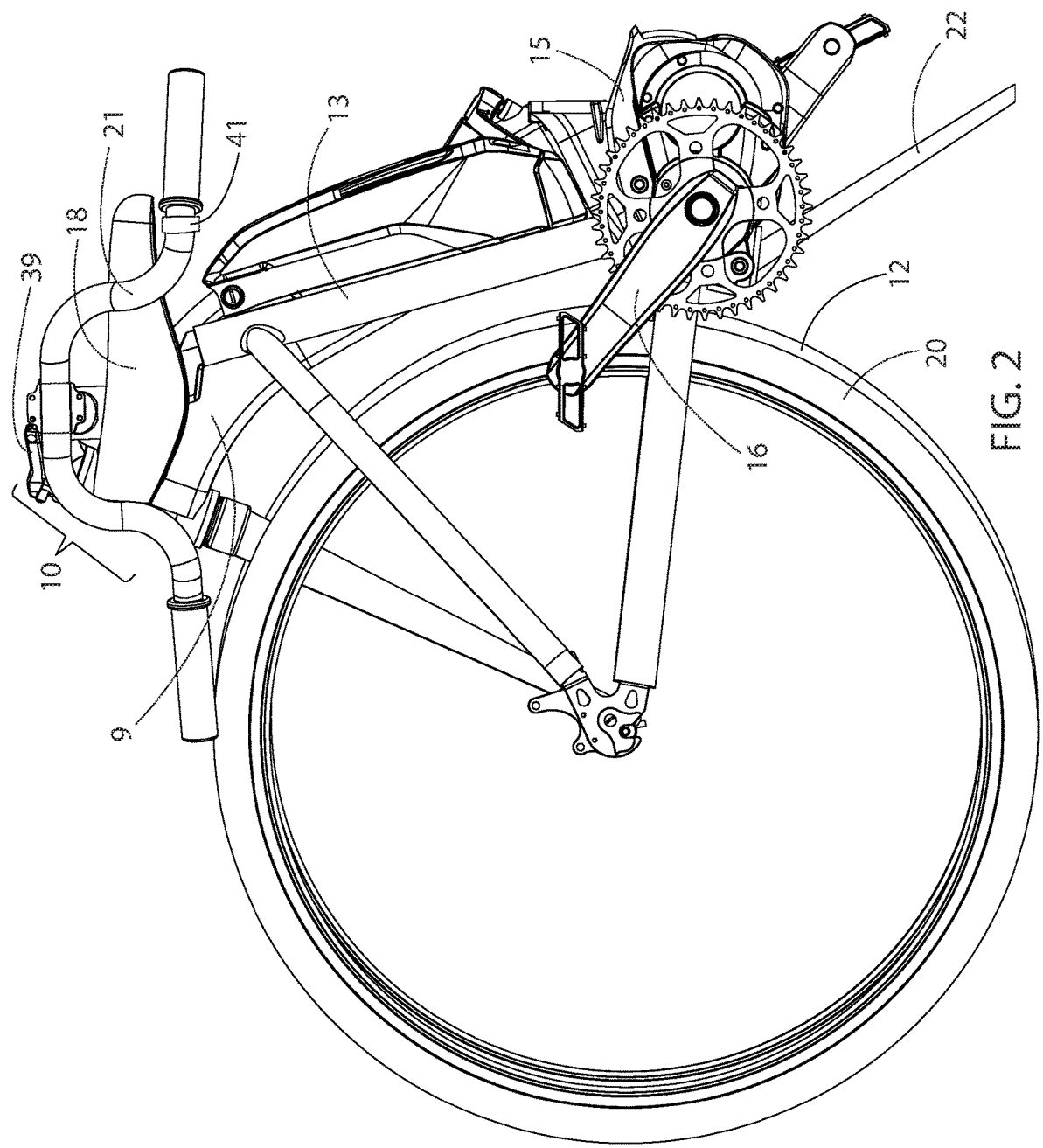
FIG. 2 illustrates a schematic side view of the low step-through foldable electric bicycle in the folded position.

Referring now to FIG. 2, low step-through foldable electric bicycle 1 is shown in the folded position wherein front wheel 12 is adjacent to, and generally parallel with, rear wheel 20. Foldable electric bicycle 1 is configured to rest on the ground in the folded position in an upright vertical position balanced on front wheel 12, rear wheel 20, and a third element, such as electric motor 4 or optional kickstand 22, configured with one or two support members, which is shown lowered and resting on the ground. In this folded position, the at least one front main member 9 is positioned adjacent to and generally parallel with seat tube member 13. As shown, handlebar 21 and stem 27 fold down to a steering assembly storage position such that handlebar 21 is generally parallel to a plane drawn through front wheel 12. Handlebar 21, stem 27, and steering assembly locking mechanism 39, parts of front wheel steering assembly 10, in the steering assembly storage position, serve to fasten foldable electric bicycle 1 in the folded position by retaining seat 18 and may be locked in the steering assembly storage position by steering assembly locking mechanism 39 or a different fastening mechanism. Optional electric motor controller 41 is shown mounted on handlebar 21 but may be mounted in another location, or may not be included when a pedal assist system and/or a radio frequency wireless control system is required.

Figure 3:
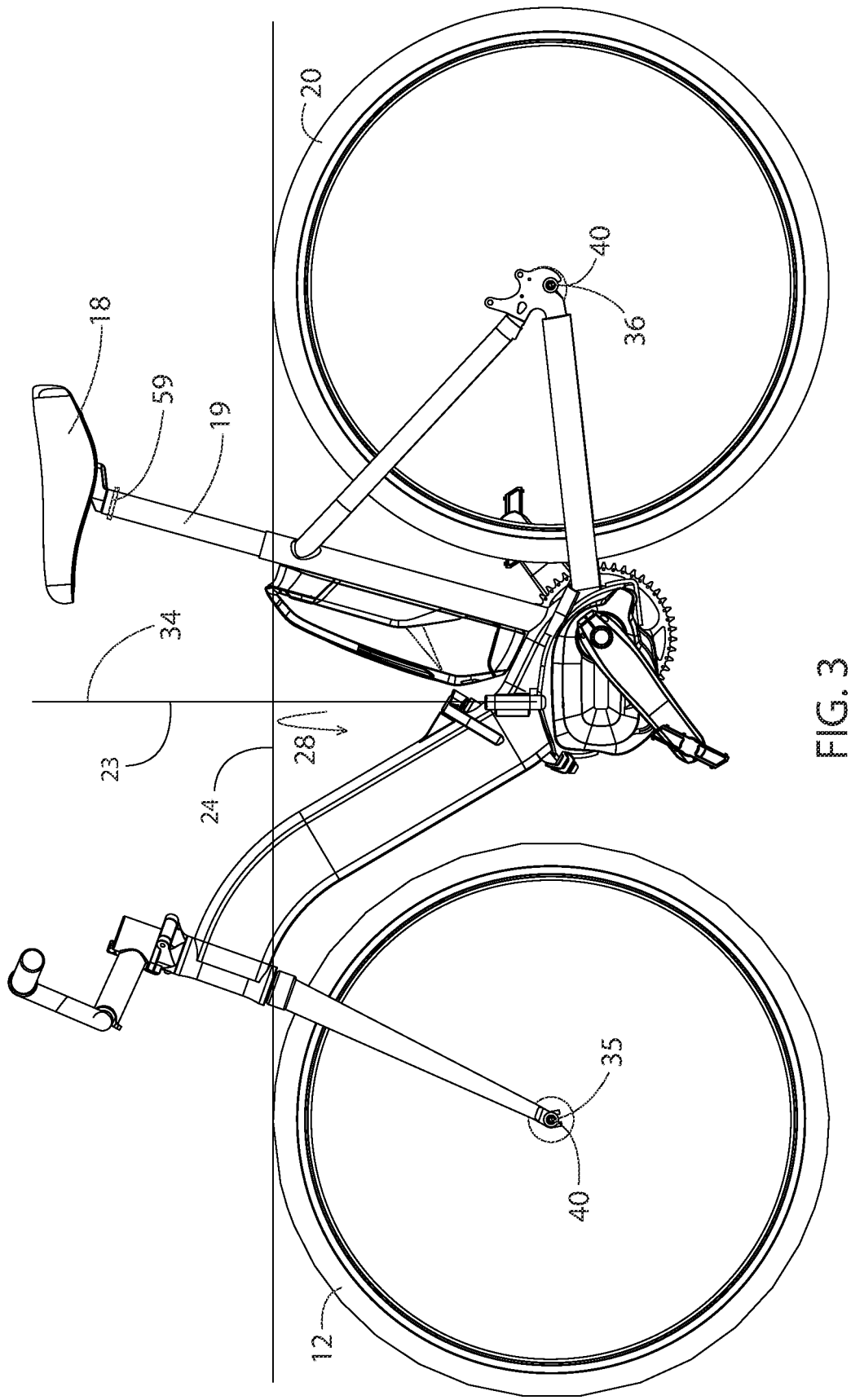
FIG. 3 illustrates a schematic left side view of the low step-through foldable electric bicycle in the riding position, showing the pivot axis oriented generally vertical to the ground, with no frame member located above a straight line drawn between the top tangent point of the front wheel and the top tangent point of the rear wheel.
Figure 13:
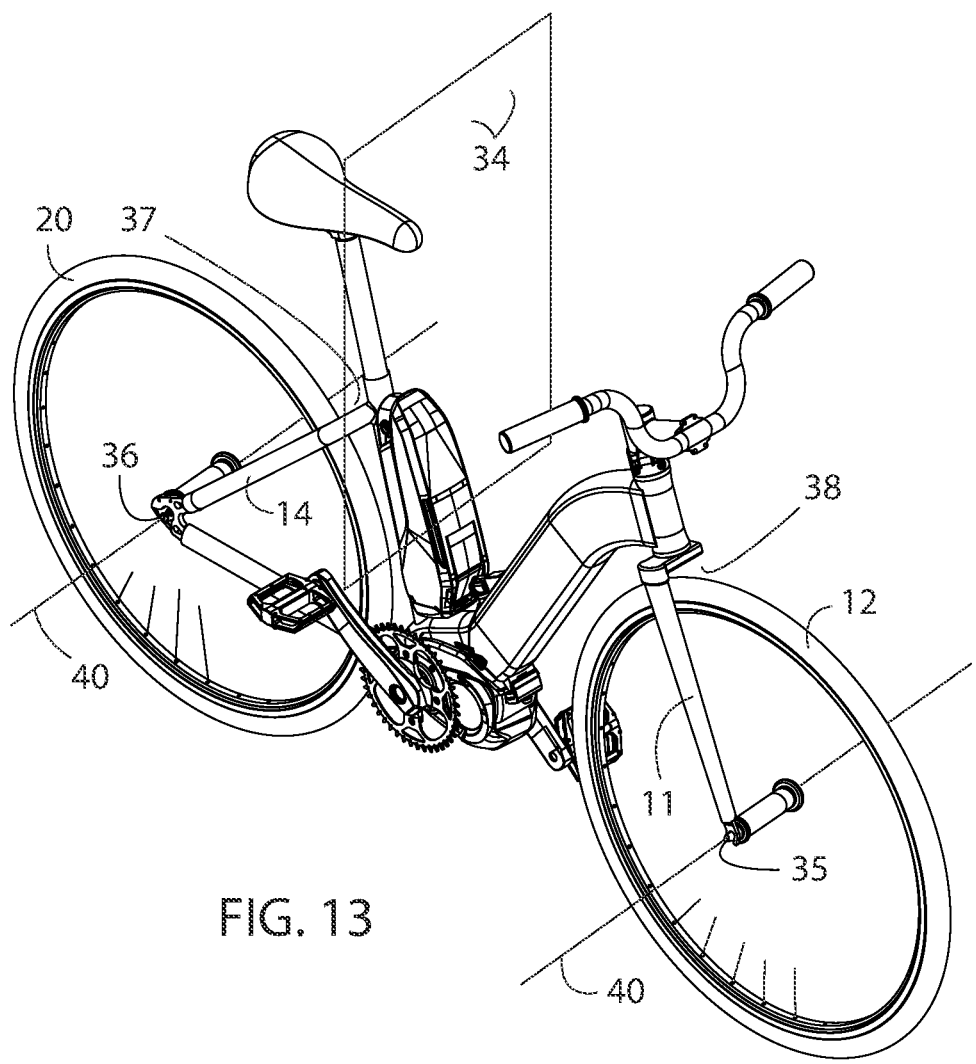
FIG. 13 illustrates a schematic perspective view of the right side, or drive-train side, of the low step-through foldable electric bicycle in the riding position wherein the rear wheel mounting assembly fastens to the rear wheel on one side only and the front fork fastens to the front wheel on one side only. Also shown are the mid-way plane, and the wheel rotation axis'.

Referring now to FIG. 3, low step-through foldable electric bicycle 1 is shown in the riding position with pivot axis 23 oriented generally vertical to the ground and mid-way plane 34 showing with no portion of a structural frame member located above a straight line 24 drawn between the top tangent point of front wheel 12 and the top tangent point of rear wheel 20. As shown, the low step-through feature is represented by arrow 28. Mid-way plane 34 is a plane of all points equidistant from front wheel rotation axis 40 through front wheel rotation axle 35 and rear wheel rotation axis 40 through rear wheel rotation axle 36 and is shown in the side view two dimensional FIG. 3 as a line. A portion of mid-way plane 34 and front and rear wheel rotation axis 40 are shown in FIG. 13. Foldable electric bicycle 1 further comprises adjustable seat height stop 59, mounted to seat post 19, which is adjustable in height along seat post 19 to provide a lower limit when lowering seat 18 and seat post 19 to a position desired for correct fastening of front wheel steering assembly 10 in the folded position. This is necessary as different models of seats, different adjustments of seats, such as angle and forward and rearward adjustment, as well as construction tolerances, require adjustments in seat height in the folded position such that front wheel steering assembly 10 fits around and captures seat 18 in a tight manner with no relative movement.

Figure 4:
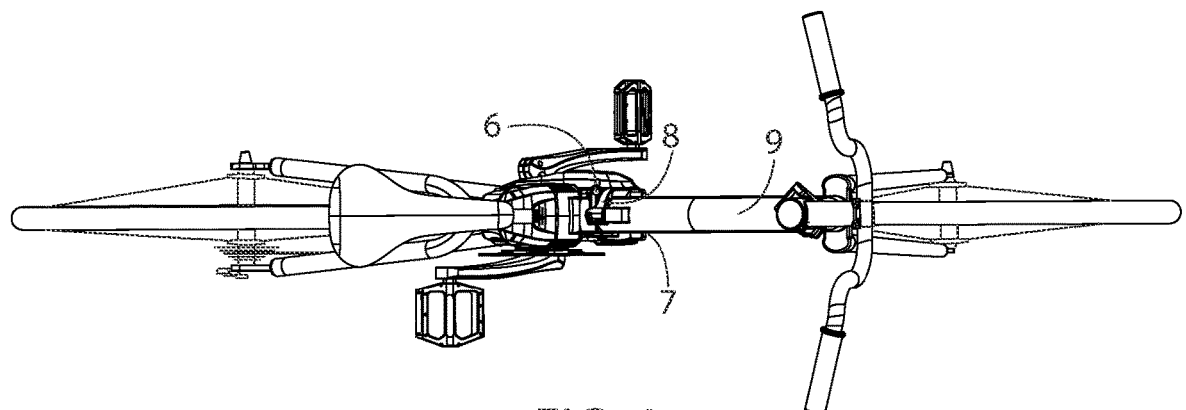
FIG. 4 illustrates a schematic plan view of the foldable bicycle in the riding position. It is the first of a sequence of five schematic drawings showing the process of the front frame assembly and the rear frame assembly pivoting laterally around the hinge in a manner moving generally parallel to the ground from the operative riding position to a folded position such that the front wheel is adjacent to, and generally parallel with, the rear wheel.
Figure 5:
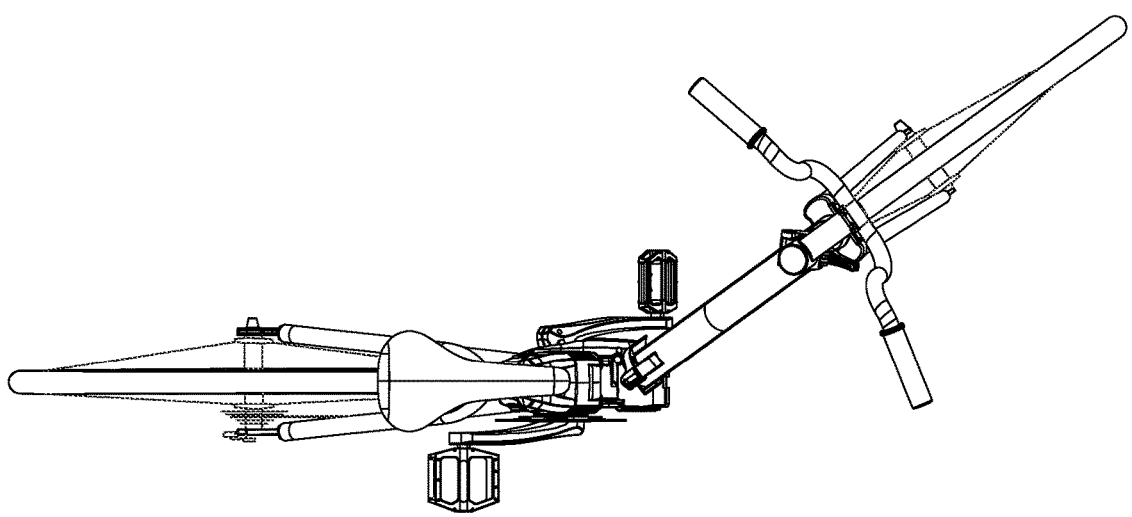
FIG. 5 illustrates a schematic plan view of the foldable bicycle having been pivoted laterally from the riding position. It is the second of a sequence of five schematic drawings showing the process of the front frame assembly and the rear frame assembly pivoting laterally around the hinge in a manner moving generally parallel to the ground.

Referring now to FIG. 4 through FIG. 8, FIG. 4 is the first figure of a sequence of five figures showing how low step-through foldable electric bicycle 1, or foldable bicycle 1 goes from the riding position to the folded position moving generally parallel to the ground during the folding process. In FIG. 4, the foldable bicycle is in the riding position. In order to begin to fold the bicycle, the operator unlocks the locking mechanism 7 using actuator 8, which may be positioned above at least one front main member 9, between a locked and unlocked state. The locking mechanism 7 may comprise a primary locking system 29, and a secondary fastening system 30 in which case locking mechanism 7 is configured to require the release of primary locking system 29, and the release of secondary fastening system 30. The release of the secondary fastening system 30 may be configured to require the active and ongoing actuation of a release mechanism during at least a first portion of the pivot laterally around hinge 6 as shown by the movement going from FIG. 4 to FIG. 5. It should be noted that an aspect of the present invention is set forth when moving the bicycle from the position shown in FIG. 5 to the position shown in FIG. 4. Locking mechanism 7 may be configured to automatically engage when foldable electric bicycle 1 is pivoted laterally around hinge 6 to the operative riding position, thus providing a safer design with a reduced chance of the operator forgetting to lock the primary locking system 29 and having the bicycle begin to fold during riding.

Figure 6:
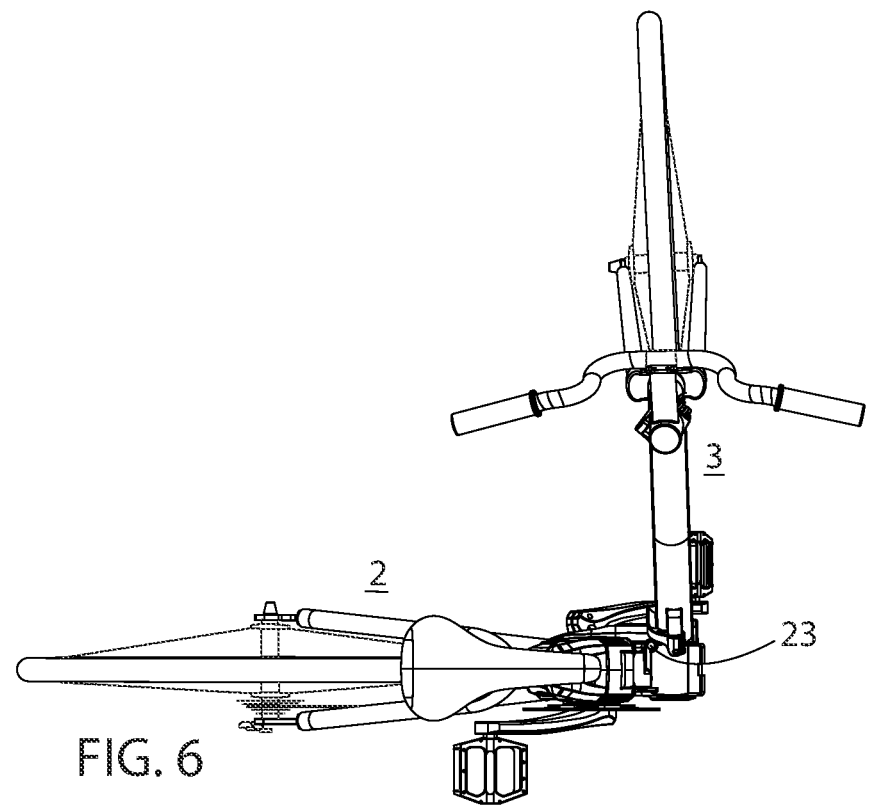
FIG. 6 illustrates a schematic plan view of the foldable bicycle having been further pivoted laterally from the riding position. It is the third of a sequence of five schematic drawings showing the process of the front frame assembly and the rear frame assembly pivoting laterally around the hinge in a manner moving generally parallel to the ground.
Figure 7:
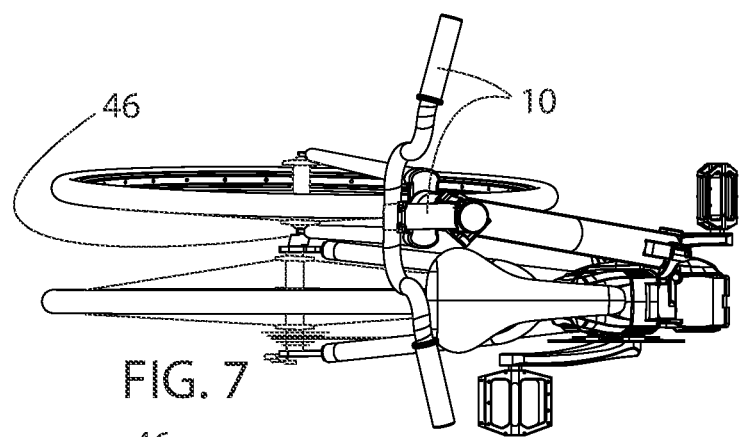
FIG. 7 illustrates a schematic plan view of the foldable bicycle with the front frame and the rear frame having reached the folded position. It is the fourth of a sequence of five schematic drawings showing the process of the front frame assembly and the rear frame assembly pivoting laterally around the hinge in a manner moving generally parallel to the ground.

FIG. 6 shows foldable electric bicycle 1 having moved further toward the folded position, and FIG. 7 shows the bicycle having reached the folded position, however, the front wheel steering assembly 10 not having been moved yet to a position to lock the frame in the folded position. During the process of folding from the position shown in FIG. 4 to the position shown in FIG. 7, front frame assembly 3 members moved in a generally horizontal pivoting motion around pivot axis 23. Alternatively, the operator may choose to move rear frame assembly 2 in a generally horizontal pivoting motion to fold foldable electric bicycle 1, or he or she may choose a combination of the two movements. Shown in FIG. 7 is wheel hub area fastener 46 which is set forth as an example of an element that may compliment the fastening of the frame in the folded position done by front wheel steering assembly 10, or may be a sole method of fastening the frame in the folded position.

Figure 8:
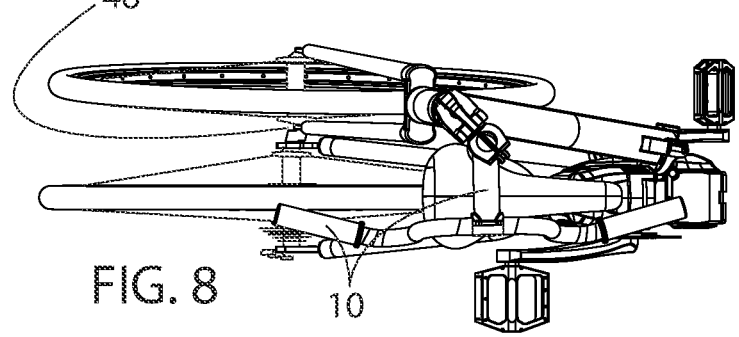
FIG. 8 illustrates a schematic plan view of the foldable bicycle with the front frame and the rear frame having reached the folded position and the handlebar and stem having been folded down to a fold-down position such that the handlebar is generally parallel to a plane drawn through the front wheel. It is the fifth of a sequence of five schematic drawings showing the process of the front frame assembly and the rear frame assembly pivoting laterally around the hinge in a manner moving generally parallel to the ground from an operative riding position to a folded position.

Finally, FIG. 8 shows foldable electric bicycle 1 in the folded position with front wheel steering assembly 10 having been moved to a position where it captures rear frame assembly 2 and holds the bicycle in the folded position. Holding the bicycle in the folded position may also be accomplished using other means such as a lock in another position such as wheel hub area fastener 46, which may include two magnets that join, one mounted to each of front frame assembly 3 and rear frame assembly 2.

Figures 9, 10:
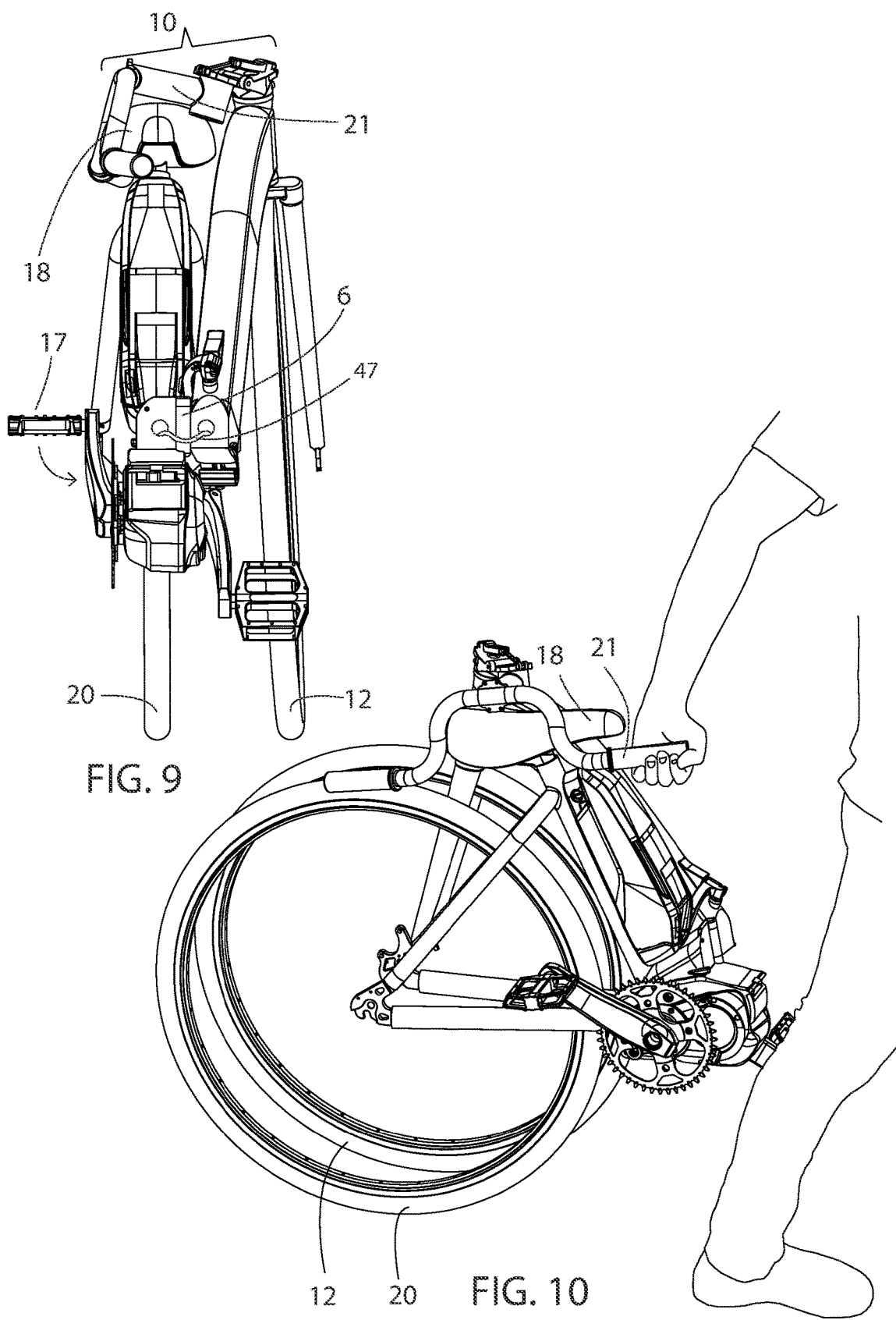
FIG. 9 illustrates a schematic hinge-end view of the low step-through foldable electric bicycle in the folded position.
FIG. 10 illustrates a perspective view of the foldable electric bicycle showing that the handlebar may be used as a handle to roll the foldable electric bicycle in the folded position.

Referring now to FIG. 9, shown is the foldable electric bicycle 1 in the folded position as viewed from the end where hinge 6 is located. It is an objective of the present invention to fasten the bicycle in the folded position, such that when it is moved, it does not start to unfold. The folding down of front wheel steering assembly 10, capturing rear frame assembly 2 by way of seat 18 accomplishes this and more as follows. First, it positions handlebar 21 generally parallel to front wheel 12 and rear wheel 20 allowing for a smaller folded size in a side to side direction. Second, it brings the vertical height of the bicycle in the folded position down in the vertical direction. Third, it fastens the front frame assembly 3 and the rear frame assembly 2 together in the folded position such that when the bicycle is lifted or moved, it will not spring apart, allowing for easier transport and storage of the folded bicycle. Fourth, it fastens front wheel steering assembly 10 so that front wheel 12 is no longer able to pivot laterally about the steering axis when the bicycle is folded, and therefore may be used to roll the folded bicycle along the ground. It should be noted that, when a folded bicycle is moved or picked up, it is desirable to not have any parts that move separately from the frame . . . . Therefore having front wheel 12 and front wheel steering assembly 10 locked in place is desirable. Finally, pedal 17 may be of a folding design allowing a further reduction in the size of the folded bicycle. Internal cable 47 is shown routing through holes in hinge.

Referring now to FIG. 10, shown is foldable electric bicycle 1 which is configured to be rolled along the ground on front wheel 12 and rear wheel 20 in the folded position, using handlebar 21 as a handle to pull the bicycle. Seat 18, or another component, may also be used as a handle when rolling the bicycle.

It is clear how a low step-through non-electric bicycle can be designed to fold by including a hinge at the mid-way plane between the two wheels. However, in the case of a mid-drive e-Bike, fitting a hinge at the mid-way plane where the motor is likely located and in conflict with the hinge position, requires a novel approach. As shown, bottom bracket area mount 15 is in close proximity with electric motor 4, pedal crank assembly 16, fastening mechanism 45, and hinge 6. These critical elements are all generally located on the low step-through electric bicycle frame at the mid-way plane 34 position making it challenging to locate all the elements in a functioning close proximity configuration. Therefore the low step-through foldable electric bike 1 set forth in this disclosure is novel and not obvious to one of ordinary skill in the art.

Figure 11:
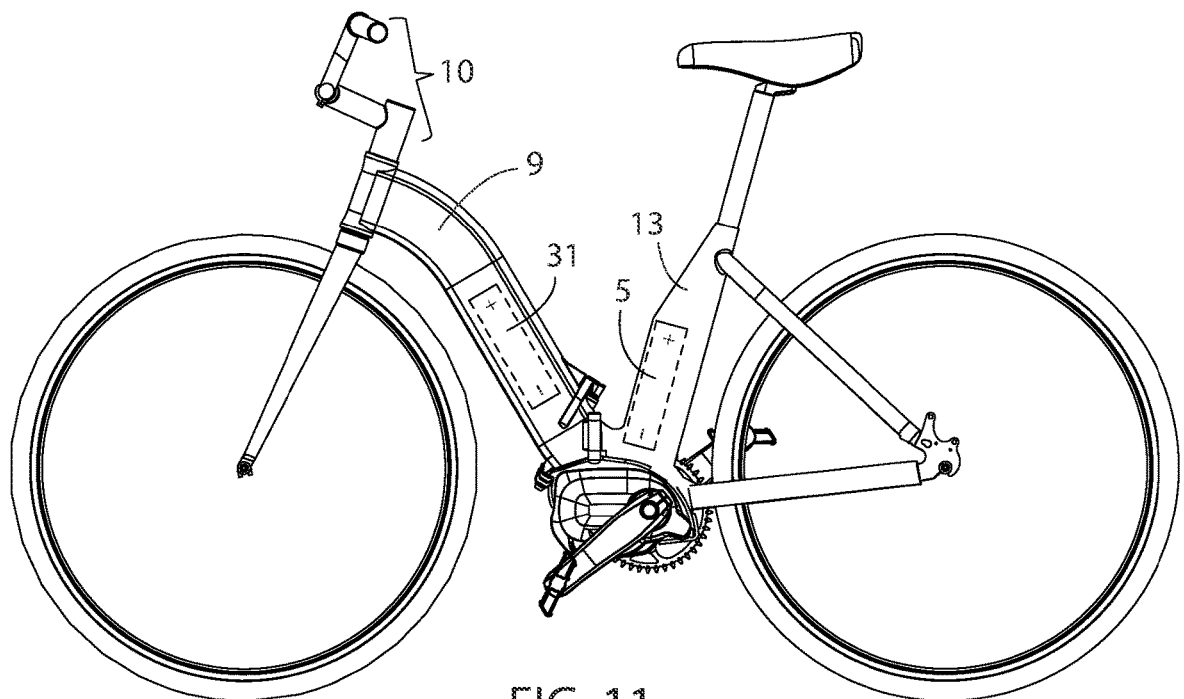
FIG. 11 illustrates a schematic left side view of the low step-through foldable electric bicycle in the riding position shown with a battery mounted in the seat tube member and an additional battery mounted in the at least one front main member.

According to one embodiment of the present invention, FIG. 11 shows low step-through foldable electric bicycle 1 where battery 5 is mounted in seat tube member 13. In addition, FIG. 11 shows foldable electric bicycle 1 wherein front main member mounted battery 31 is shown mounted in at least one front main member 9. Foldable electric bicycle 1 may be equipped with only a seat tube member 13 mounted battery, only a front main member 9 mounted battery, or a combination of both a seat tube member 13 mounted battery and a front main member 9 mounted battery. The batteries may be mounted exterior to the frame member, interior to the frame member, or partially interior and partially exterior to the frame member. In FIG. 11, front wheel steering assembly 10 is shown without the fold-down feature, and an alternative fastening mechanism to fasten the frame in the folded position may be used.

Figure 12:
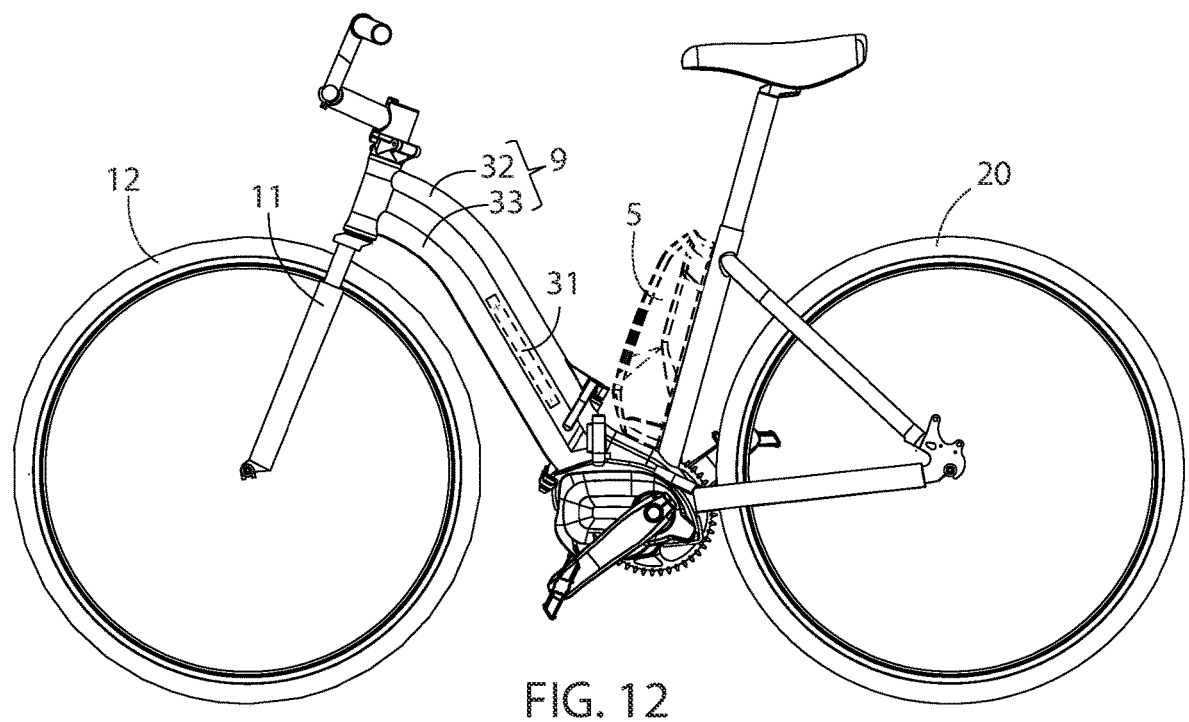
FIG. 12 illustrates a schematic left side view of the low step-through foldable electric bicycle in the riding position shown where the at least one front main member consists of two front main members. Also shown is a battery mounted on the at least one front main member.

According to one embodiment of the present invention, FIG. 12 shows foldable electric bicycle 1 wherein at least one front main member 9 consists of upper front main member 32 and lower front main member 33. Any number of front main members of different shapes may be used, being parallel to each other, or not parallel to each other. Also shown in FIG. 12 is front main member mounted battery 31 mounted between upper front main member 32 and lower front main member 33. Battery 5 is shown as optional and foldable electric bicycle 1 is shown with a suspension front fork 11.

FIG. 13 shows low step-through foldable electric bicycle 1 wherein rear wheel mounting assembly 14 fastens to rear wheel rotation axle 36 on one side of rear wheel 20 only and has no apparatus on the opposite side of rear wheel 20. The rear left side mounting assembly 37 which is typically included has been removed. In addition, front fork 11 fastens to front wheel rotation axle 35 on one side of front wheel 12 only and has no apparatus on the opposite side of front wheel 12. The front left side fork 38 which is typically included has been removed. The exclusion of rear left side mounting assembly 37 and/or front left side fork 38 is advantageous to allow for foldable electric bicycle 1 to fold to a more compact size by allowing for a smaller width in the folded position. Also shown is mid-way plane 34 and wheel rotation axis 40.

Figure 14:
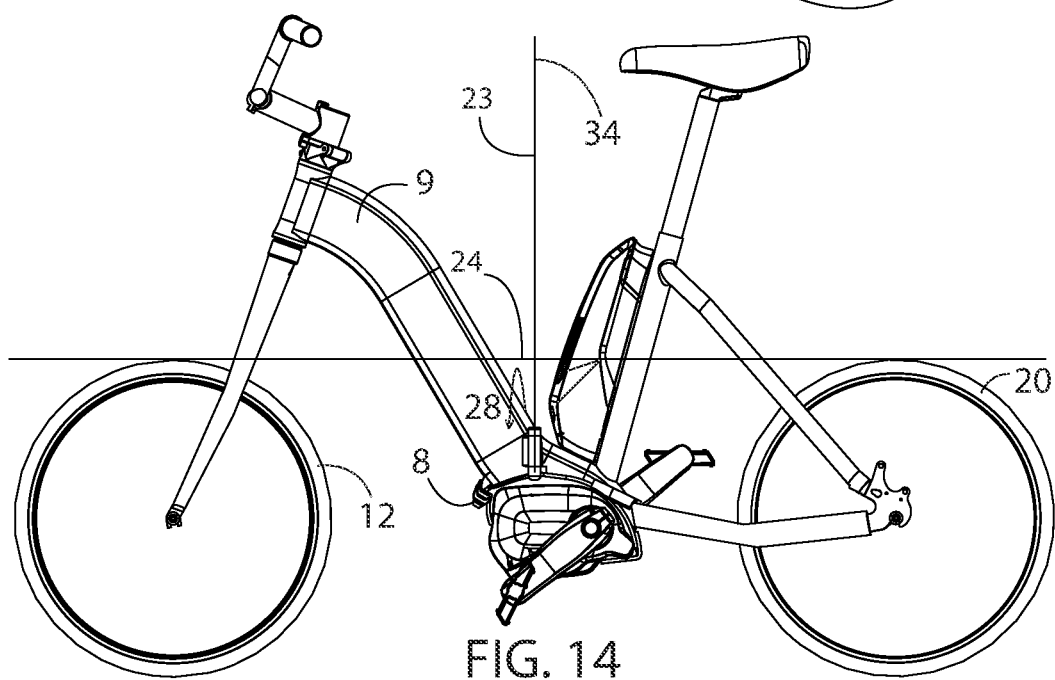
FIG. 14 illustrates a schematic left side view of the low step-through foldable electric bicycle in the riding position shown with smaller wheels.

FIG. 14 shows low step-through foldable electric bicycle 1 wherein front wheel 12 and rear wheel 20 are a different size from other figures, and preferably 24 inch wheels, and more preferably 20 inch wheels and most preferably 16 inch wheels. FIG. 14 demonstrates that the fundamental feature of a low step-through frame may be combined with different wheel sizes. Also shown is actuator 8 being located in a position other than on the upper surface of front main member 9. In addition, pivot axis 23 and mid-way plane 34 are shown with low step-through arrow 28 located below straight line 24.

Figure 15:
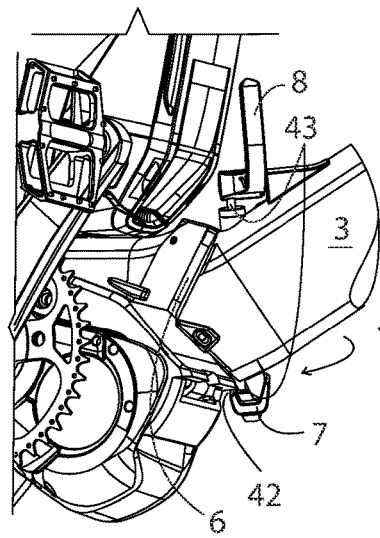
FIG. 15 illustrates a schematic view of the bottom bracket area mount, the hinge, the actuator, and the locking mechanism shown with the front frame assembly moving toward the riding position. It is the first of a sequence of three schematic drawings showing the process of the frame moving to the riding position and a locking mechanism automatically engaging.
Figure 16:
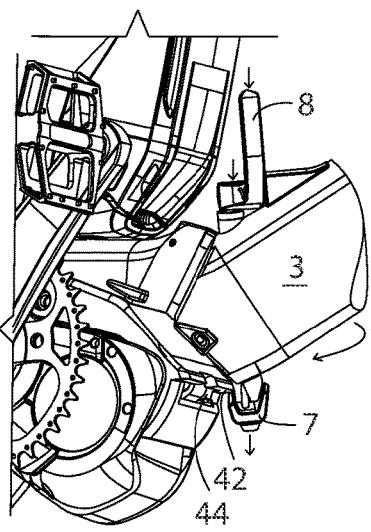
FIG. 16 illustrates a schematic view of the bottom bracket area mount, the hinge, the actuator, and the locking mechanism shown with the front frame assembly moving further toward the riding position. It is the second of a sequence of three schematic drawings.
Figure 17:
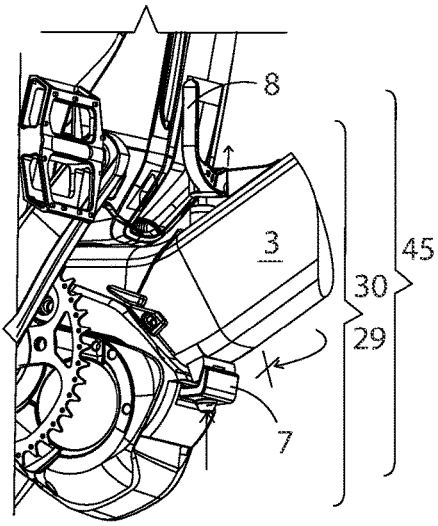
FIG. 17 illustrates a schematic view of the bottom bracket area mount, the hinge, the actuator, and the locking mechanism shown having been pivoted to the riding position but primary retention not engaged. It is the third of a sequence of three schematic drawings showing the process of the frame moving to the riding position and a locking mechanism automatically engaging.

FIGS. 15-17 show the automatic fastening of the secondary fastening system 30. While foldable electric bicycle 1 is shown and discussed, the fastening system applies to a foldable bicycle in general. Fastening mechanism 45, containing a primary locking system 29 and a secondary fastening system 30, is configured such that the secondary fastening system 30 automatically engages when foldable electric bicycle 1 is pivoted laterally around hinge 6 to the operative riding position. Actuator 8 is shown as a cam quick release that is connected by skewer 43 to locking mechanism 7. A spring (not shown) biases the assembly (actuator 8, skewer 43, and locking mechanism 7) toward the actuator 8 end. As front frame assembly 3 is moved to the riding position as shown in FIG. 16, locking mechanism 7 encounters automatic surface 42 which causes the assembly to move toward the locking mechanism 7 end thereby compressing the spring. When the assembly reaches the riding position shown in FIG. 17, locking mechanism 7 has moved past automatic surface 42 and the spring causes it to enter into secondary fastening system hole 44 thereby engaging secondary fastening system 30. Finally, actuator 8 is closed (to the position shown in FIG. 18) engaging primary locking system 29 and making foldable electric bicycle 1 ready to ride. It should be noted that in the embodiment shown, the primary locking system 29 and secondary fastening system 30 share various elements.

Figure 18:
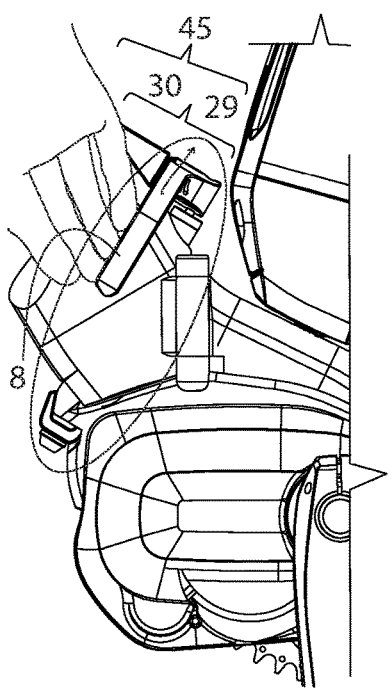
FIG. 18 illustrates a schematic view of the bottom bracket area mount, the hinge, the actuator, and the locking mechanism shown with the frame in the riding position and a hand beginning to unlock the primary locking system. It is the first of a sequence of three schematic drawings showing the process of unlocking the locking mechanism and manually holding the secondary fastening system disengaged in preparation for folding the bicycle.
Figure 19:
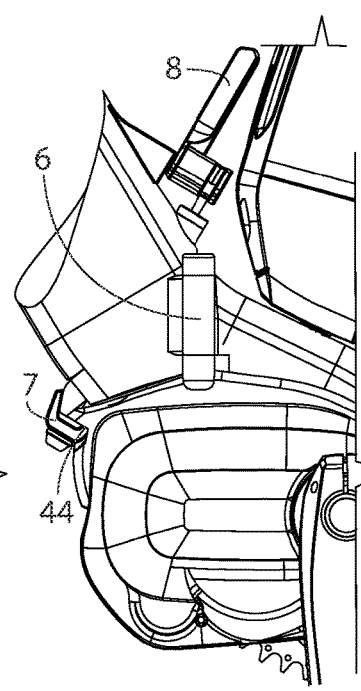
FIG. 19 illustrates a schematic view of the bottom bracket area mount, the hinge, the actuator, and the locking mechanism shown with the frame in the riding position and the primary locking system in the unlocked position, but the secondary fastening system still engaged. It is the second of a sequence of three schematic drawings.
Figure 20:
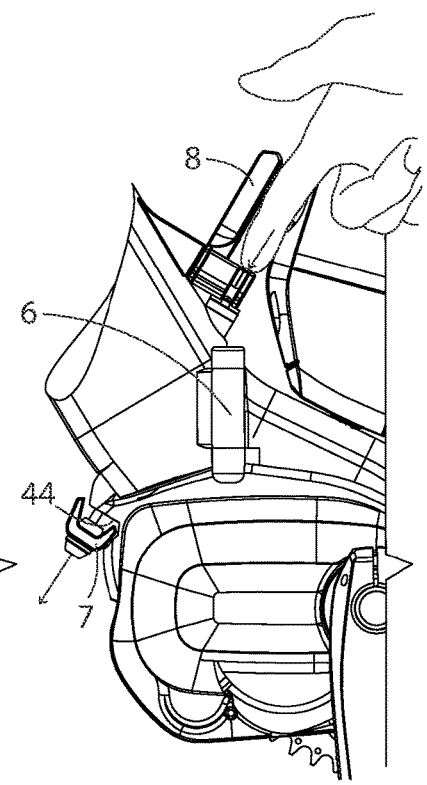
FIG. 20 illustrates a schematic view of the bottom bracket area mount, the hinge, the actuator, the locking mechanism shown with the frame in the riding position and the primary locking system in the unlocked position, and a hand causing active and ongoing actuation of a release mechanism of the secondary fastening system. It is the third of a sequence of three schematic drawings showing the process of unlocking the locking mechanism and manually holding the secondary fastening system disengaged in preparation for folding the bicycle.

FIGS. 18-20 show low step-through foldable electric bicycle 1 wherein a fastening mechanism 45 is configured to require, before the lateral pivot to the folded position may begin, the unlocking of primary locking system 29 and wherein secondary fastening system 30 is configured to require the active and ongoing actuation of a release mechanism during at least a first portion of the pivot laterally around hinge 6. FIG. 18 illustrates foldable electric bicycle 1 in the locked and riding position and shows a hand ready to operate actuator 8. FIG. 19 shows actuator 8 having been unlocked thus releasing primary locking system 29. In this position, secondary fastening system 30 remains engaged with locking mechanism 7 retained in secondary fastening system hole 44. FIG. 20 shows actuator 8 being pushed by a hand causing locking mechanism 7 to exit secondary fastening system hole 44 releasing secondary fastening system 30 and making foldable electric bicycle 1 fully unlocked and ready for a first portion of the pivot laterally around hinge 6. The apparatus set forth in FIGS. 18-20 is applicable to a foldable bicycle.

Figure 21:
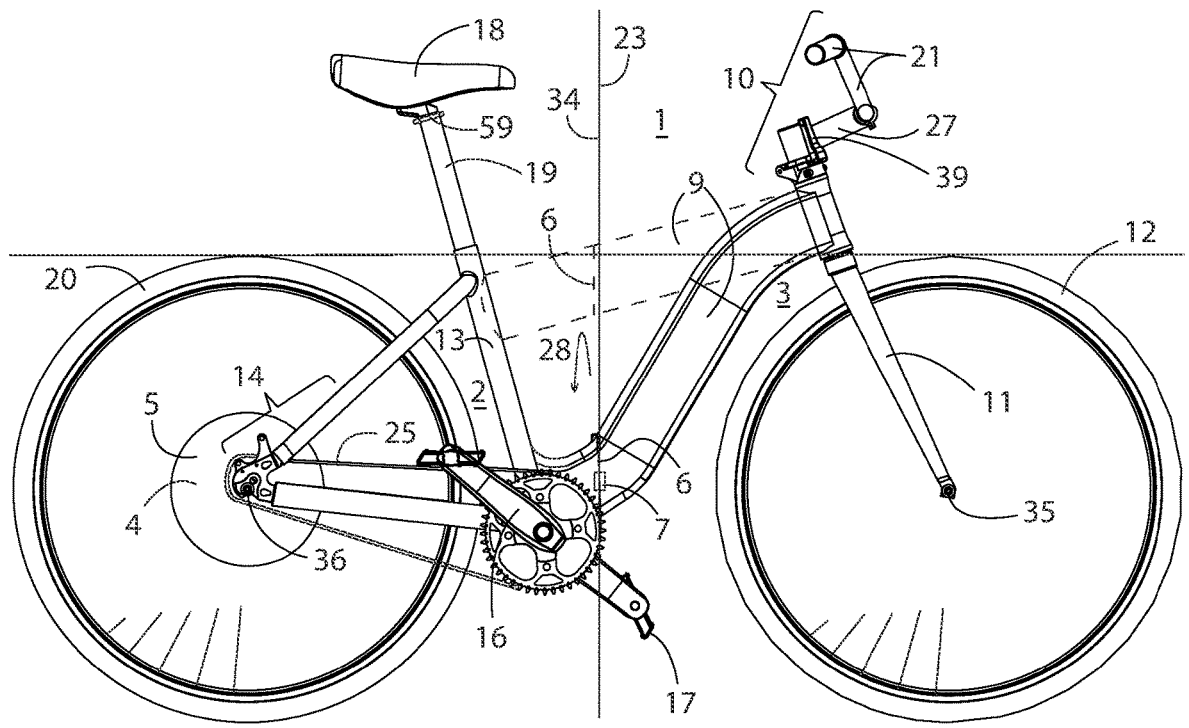
FIG. 21 illustrates a schematic right side view of the foldable bicycle in the rideable position with a handlebar and stem that are moveable to a steering assembly storage position where the handlebar and/or the stem or another connected element fasten the foldable bicycle in the folded position.
Figure 22:
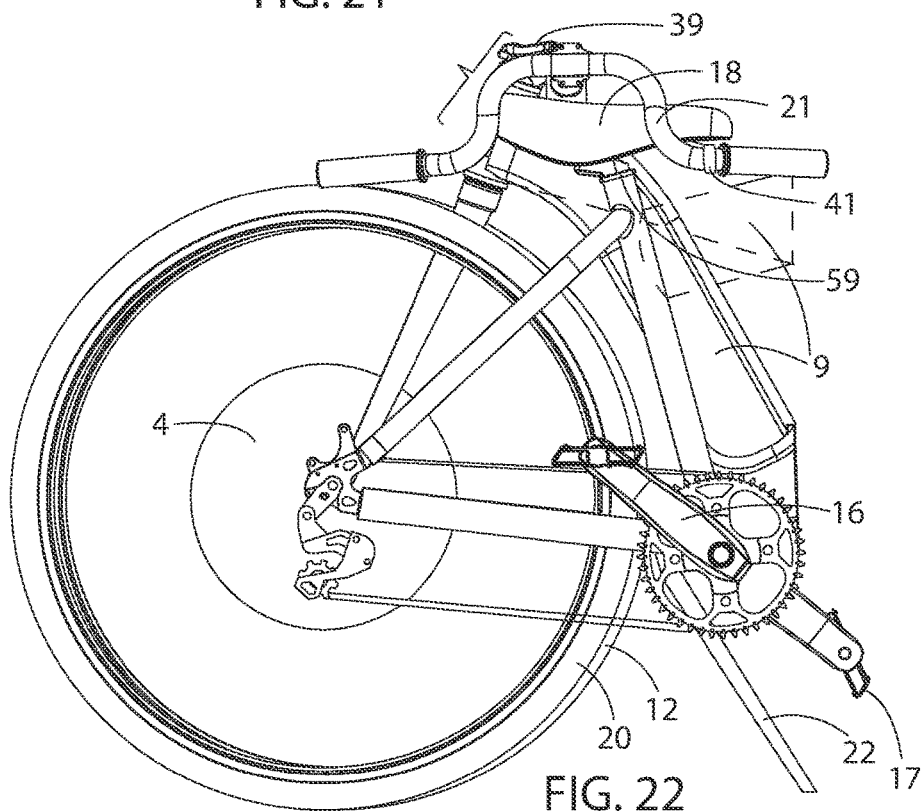
FIG. 22 illustrates a schematic view of the foldable bicycle in the folded position with the handlebar and stem moved to a steering assembly storage position where the handlebar and/or the stem or another connected element fasten the foldable bicycle in the folded position.
Figure 23:
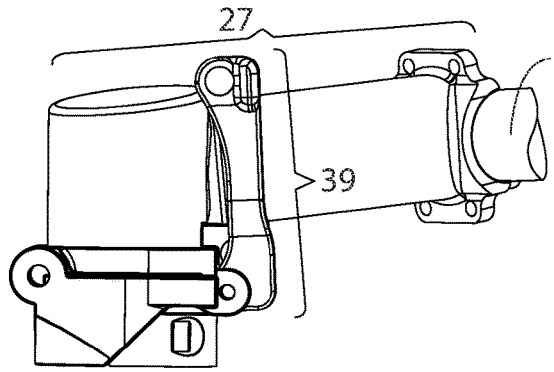
FIG. 23 illustrates a schematic view of the foldable bicycle handlebar and stem with the steering assembly locking mechanism locked in the riding position.
Figure 24:
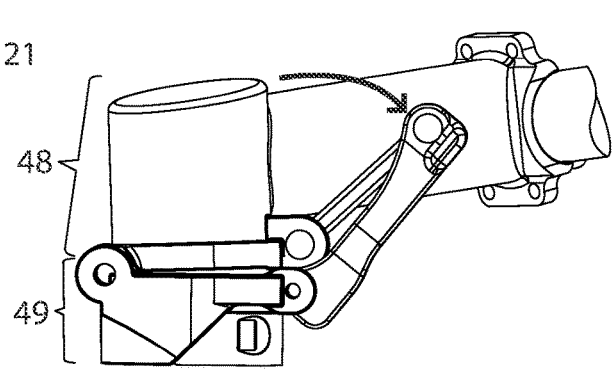
FIG. 24 illustrates a schematic view of the foldable bicycle handlebar and stem with the steering assembly locking mechanism beginning the process of being unlocked.
Figure 25:
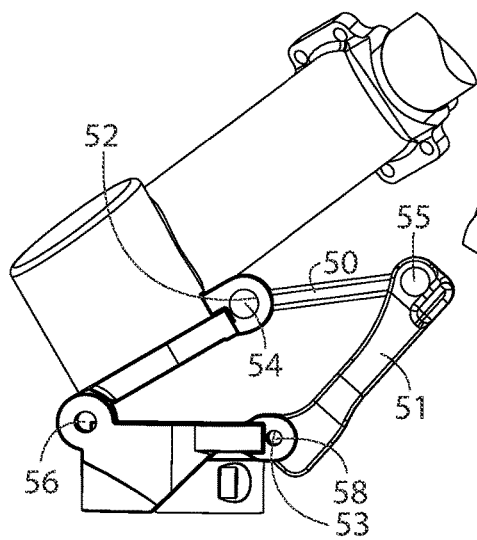
FIG. 25 illustrates a schematic view of the foldable bicycle handlebar and stem with steering assembly locking mechanism unlocked and the stem beginning the process of moving to the folded position.
Figure 26:
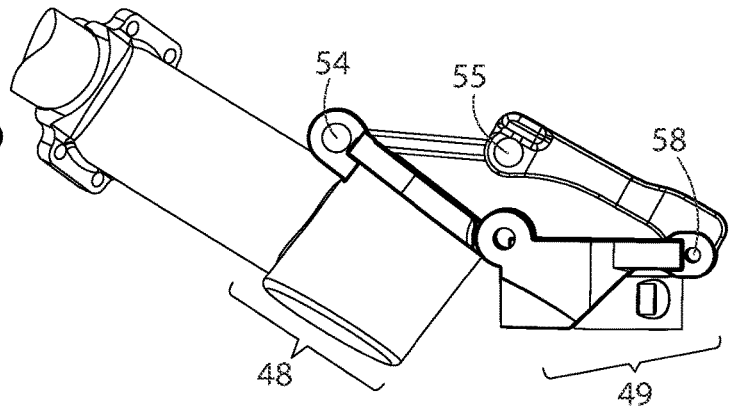
FIG. 26 illustrates a schematic view of the foldable bicycle handlebar and stem with steering assembly locking mechanism unlocked and the stem moving to the folded position.
Figure 27:
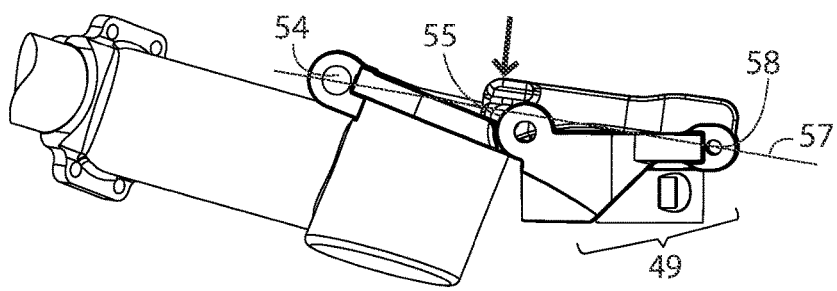
FIG. 27 illustrates a schematic view of the foldable bicycle handlebar and stem with steering assembly locking mechanism pushed down to a locked position and the front wheel steering assembly in the folded position.

According to one embodiment of the present invention, FIGS. 21-22 show a foldable bicycle 1, either electric or non-electric, and either low step-through or non-low-step-through, comprising a front frame assembly 3 and a rear frame assembly 2, wherein front frame assembly 3 comprises at least one front main member 9, and front wheel steering assembly 10 including handlebar 21, stem 27, and steering assembly locking mechanism 39, mounted to a front fork 11; a hinge 6 and locking mechanism 7, with a pivot axis 23 oriented generally vertical to the ground and located proximate to a vertical mid-way plane 34 equidistant from the rotation axis of the front wheel rotation axle 35 and the rotation axis of the rear wheel rotation axle 36, which allows front frame assembly 3 and rear frame assembly 2 to pivot laterally around the pivot axis 23 in a manner moving generally parallel to the ground, from an operative riding position to a folded position such that front wheel 12 is adjacent to, and generally parallel with, the rear wheel 20; and wherein the handlebar 21 and stem 27 are moveable to a steering assembly storage position, and in the storage position the handlebar 21 and/or stem 27, or a comparable component, fasten the foldable bicycle in the folded position. Furthermore handlebar 21, in the steering assembly storage position, is generally parallel to front wheel 12 allowing for a smaller folded size. The steering assembly locking mechanism 39 fastens front wheel steering assembly 10 in one or both the operative riding position and/or the steering assembly storage position. The handlebar 21 and/or stem 27 or another component, may be configured to fasten foldable bicycle 1 in the folded position by contacting and retaining a rear frame assembly 2 component such as seat 18, which is fastened to seat tube member 13 by seat post 19. Foldable bicycle 1 is configured to be rolled along the ground on front wheel 12 and rear wheel 20 in the folded position and preferably handlebar 21 is configured to be used as a handle to roll foldable bicycle 1 in the folded position. Furthermore, foldable bicycle 1 is configured to stand upright in the folded position with front wheel 12 and rear wheel 20 and optional kickstand 22 resting on the ground and if kickstand 22 is not included, then pedal crank assembly 16 with pedal 17, or another component may be the third point of contact on the ground. Furthermore, foldable bicycle 1 is configured such that the movement of front wheel steering assembly 10 to a steering assembly storage position reduces the overall width of foldable bicycle 1 in the folded position and preferably lowers the overall height of foldable bicycle 1 in the folded position and more preferably prevents unwanted lateral pivoting of front wheel 12 and front wheel steering assembly 10 in the folded position. Foldable bicycle 1 may be configured to include an electric motor 4 and/or a battery 5 located on, or proximate to the rear wheel rotation axle 36, the front wheel rotation axle 35, or in a different location, such as a mid-drive, driving drive power transfer component 25. Foldable bicycle 1 may be configured wherein rear wheel mounting assembly 14 and/or front fork 11 may be configured to fasten to rear wheel 20 and front wheel 12 respectively on one side, preferably the right side, or both sides of the wheel. Rear wheel mounting assembly 14 may fasten to rear wheel rotation axle 36 on one side of rear wheel 20 only with no apparatus on the opposite side of rear wheel 20. In addition, front fork 11 may fasten to front wheel rotation axle 35 on one side of front wheel 12 only with no apparatus on the opposite side of front wheel 12. The exclusion of one or both of rear left side mounting assembly 37 and/or front left side fork 38 is advantageous to allow for foldable bicycle 1 to fold to a more compact size by allowing for a smaller width in the folded position. In addition, a configuration may include wheel sizes of 29 inches, 27.5 inches, 700c, 26 inches, 24 inches, 20 inches, or 16 inches, or 700 millimeters, or another size. In accordance with an aspect of the present invention, the locking mechanism 7 comprises an actuator 8 positioned above the at least one front main member 9 which moves locking mechanism 7 between a locked state and a unlocked state and preferably actuator 8 operates locking mechanism 7 positioned below the at least one front main member 9. Furthermore, the locking mechanism 7 may comprise a primary locking system 29, and a secondary fastening system 30 and is preferably configured to require the active and ongoing actuation of a release mechanism during at least a first portion of the pivot laterally around hinge 6 to the folded position and more preferably at least a portion of the locking mechanism 7 is configured to automatically engage when foldable bicycle 1 is pivoted laterally around hinge 6 to the operative riding position. In accordance with an aspect of the present invention, in the folded position, the at least one front main member 9 is positioned adjacent to, and generally parallel with, seat tube member 13. In accordance with an aspect of the present invention, rear wheel mounting assembly 14 fastens to rear wheel 20 on at least one side of the rear wheel and front fork 11 fastens to front wheel 12 on at least one side of the front wheel. Foldable electric bicycle 1 is configured to rest on the ground in the folded position in an upright, vertical position balanced on front wheel 12, rear wheel 20, and a third element, such as pedal crank assembly 16 or optional kickstand 22, configured with one or two support members, which is shown lowered and resting on the ground. Foldable bicycle 1 further comprises adjustable seat height stop 59, mounted to seat post 19, which is adjustable in height along seat post 19 to provide a lower limit when lowering seat 18 and seat post 19 to a position desired for correct fastening of front wheel steering assembly 10 in the folded position. FIGS. 23-27 show stem 27 (and partial handlebar 21) going from the operative riding position to the folded position wherein stem 27 comprises steering assembly locking mechanism 39 which is configured to fasten stem 27 in the operative riding position in one condition (FIG. 23), and which is configured to fasten stem 27 in a folded position in a different condition (FIG. 27). Stem 27 is configured with a stem first portion 48 and a stem second portion 49, wherein stem first portion 48 is pivotally connected to stem second portion 49 at stem pivot 56, and stem first portion 48 comprises a first lock mounting hole 52, and stem second portion 49 comprises a second lock mounting hole 53; wherein steering assembly locking mechanism 39 comprises a first pivoting member 50 comprising pivot A 54 on one end and pivot B 55 on the other end, and a second pivoting member 51 comprising pivot C 58 on one end and pivot B 55 on the other end, wherein first pivoting member 50 is pivotally connect at pivot A 54 to first lock mounting hole 52, and second pivoting member 51 is pivotally connected at pivot C 58 to second lock mounting hole 53, and wherein first pivoting member 50 is connected at pivot B 55 to second pivoting member 51 at pivot B 55, and wherein the distance between pivot A 54 and pivot B 55 on first pivoting member 50 is different from the distance between pivot C 58 and pivot B 55 on second pivoting member 51. Furthermore, steering assembly locking mechanism 39 may be moved to a locked position for operative riding position, and in the locked position first pivoting member 50 is in compression, and second pivoting member 51 is in tension. Furthermore steering assembly locking mechanism 39 is configured to fasten stem 27 in the folded position wherein first pivoting member 50 is in compression, and second pivoting member 51 is also in compression. In the operative riding position, first pivoting member 50 and second pivoting member 51 are configured to be generally parallel and adjacent to one another while in the folded position with steering assembly locking mechanism 39 locked, first pivoting member 50 and second pivoting member 51 are end to end relative to one another, with pivot B 55 having moved beyond a centerline 57 drawn between pivot A 54 on first pivoting member 50 and pivot C 58 on second pivoting member 51. In the folded and fastened position, pivot B 55 is prevented from rotating further by the proximity of stem second portion 49 and thereby prevents stem first portion 48 from unfolding to the operative riding position until pivot B 55 is manually returned to a position above centerline 57 away from stem second portion 49. Stem 27 is configured to be moved from the operative riding position to the folded position by first unlocking steering assembly locking mechanism 39 (FIG. 24), then moving handlebar 21 and stem first portion 48 to the folded position (FIGS. 25-26), and finally moving pivot B 55 beyond/below centerline 57 in the direction of the arrow. The movement of front wheel steering assembly 10 to the folded position causes the fastening of the folded bicycle together, prevents front wheel 12 from lateral pivoting, and prevents the movement of stem 27 and handlebar 21.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:
1. A foldable electric bicycle, comprising:
 a front frame assembly comprising:
  a front wheel steering assembly comprising:
   a front fork,
   a handlebar and stem mounted to said front fork,
   a front wheel with rotation axle mounted to said front fork;
  a front frame comprising:
   a head tube for pivotally mounting said steering assembly,
   at least one front main member;
 a rear frame assembly comprising:
  a rear frame comprising:
   a rear wheel mounting assembly,
   a seat tube member,
   a bottom bracket area mount for mounting an electric motor and pedal crank assembly;
  a rear wheel with rotation axle mounted to said rear wheel mounting assembly, a seat post and seat mounted to said seat tube member,
a drive power transfer component,
an electric motor mounted at said bottom bracket area mount to drive said drive power transfer component;
a hinge with a pivot axis oriented generally vertical to the ground, located proximate to a vertical mid-way plane equidistant from the rotation axis of said front wheel rotation axle and the rotation axis of said rear wheel rotation axle;
a locking mechanism comprising components on said front frame assembly and components on said rear frame assembly;
at least one battery mounted to said rear frame assembly and/or said front frame assembly to supply electrical power to said electric motor;
wherein said at least one front main member is connected to said head tube and extends generally rearward from said head tube to said hinge;
and wherein, at said vertical mid-way plane, no portion of any structural frame member is located above a straight line drawn between the top tangent point of said front wheel and the top tangent point of said rear wheel;
and wherein said hinge joins said front frame assembly and said rear frame assembly together in an operative riding position and allows said front frame assembly and said rear frame assembly to pivot laterally around said hinge in a manner moving generally parallel to the ground, from said operative riding position to a folded position such that said front wheel is adjacent to, and generally parallel with, said rear wheel.

2. The foldable electric bicycle of claim 1 wherein said at least one battery is mounted on or in said seat tube member.

3. The foldable electric bicycle of claim 1 wherein said at least one battery is mounted on or in said at least one front main member.

4. The foldable electric bicycle of claim 1 wherein said foldable electric bicycle is configured to be rolled along the ground on said front wheel and said rear wheel in said folded position.

5. The foldable electric bicycle of claim 4 wherein said handlebar may be used as a handle to roll said foldable electric bicycle.

6. The foldable electric bicycle of claim 1 wherein said locking mechanism comprises an actuator positioned above said at least one front main member which moves a locking mechanism element between a locked state and a unlocked state.

7. The foldable electric bicycle of claim 6 wherein said actuator operates said locking mechanism element positioned below said at least one front main member.

8. The foldable electric bicycle of claim 1 wherein said locking mechanism comprises a primary locking system, and a secondary fastening system.

9. The foldable electric bicycle of claim 8 wherein said locking mechanism is configured to require the active and ongoing actuation of a release mechanism during at least a first portion of said pivot laterally around said hinge to said folded position.

10. The foldable electric bicycle of claim 8 wherein at least a portion of said locking mechanism is configured to automatically engage when said foldable electric bicycle is pivoted laterally around said hinge to said operative riding position.

11. The foldable electric bicycle of claim 1 wherein said electric motor provides power to assist in driving said drive power transfer component.

12. The foldable electric bicycle of claim 1 wherein said electric motor provides power to drive said drive power transfer component independent from whether an operator is operating said pedal crank assembly of said foldable electric bicycle.

13. The foldable electric bicycle of claim 1 wherein, in said folded position, said at least one front main member is positioned adjacent to, and generally parallel with, said seat tube member.

14. The foldable electric bicycle of claim 1 wherein said rear wheel mounting assembly fastens to said rear wheel on at least one side of said rear wheel and said front fork fastens to said front wheel on at least one side of said front wheel.

* * * * *